Dec. 15, 1925.　　　　　　　　　　　　　　　　1,565,396
H. R. REGAL
SPEED CHANGING AND CONTROLLING MECHANISM FOR MOTOR VEHICLES OR THE LIKE
Filed Dec. 9, 1924　　　2 Sheets-Sheet 1
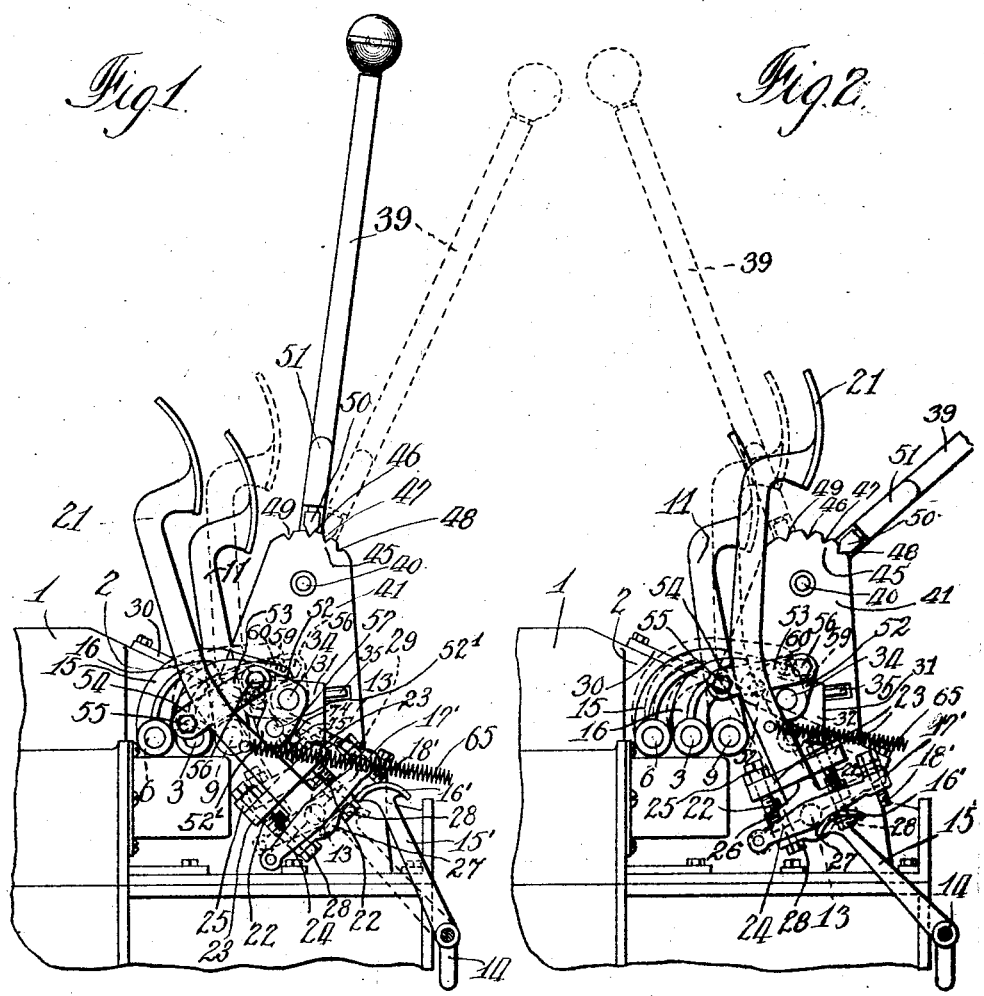
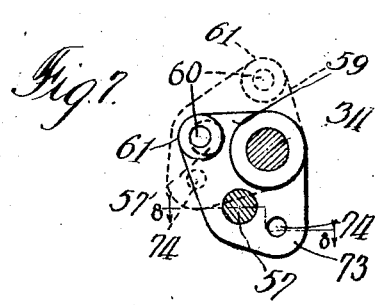
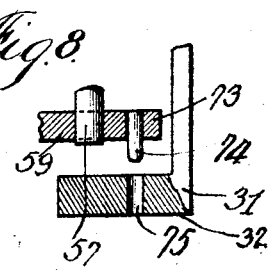
Inventor:
Herman R Regal
By Clarence Chamberlain
Atty.

Dec. 15, 1925. 1,565,396
H. R. REGAL
SPEED CHANGING AND CONTROLLING MECHANISM FOR MOTOR VEHICLES OR THE LIKE
Filed Dec. 9, 1924 2 Sheets-Sheet 2
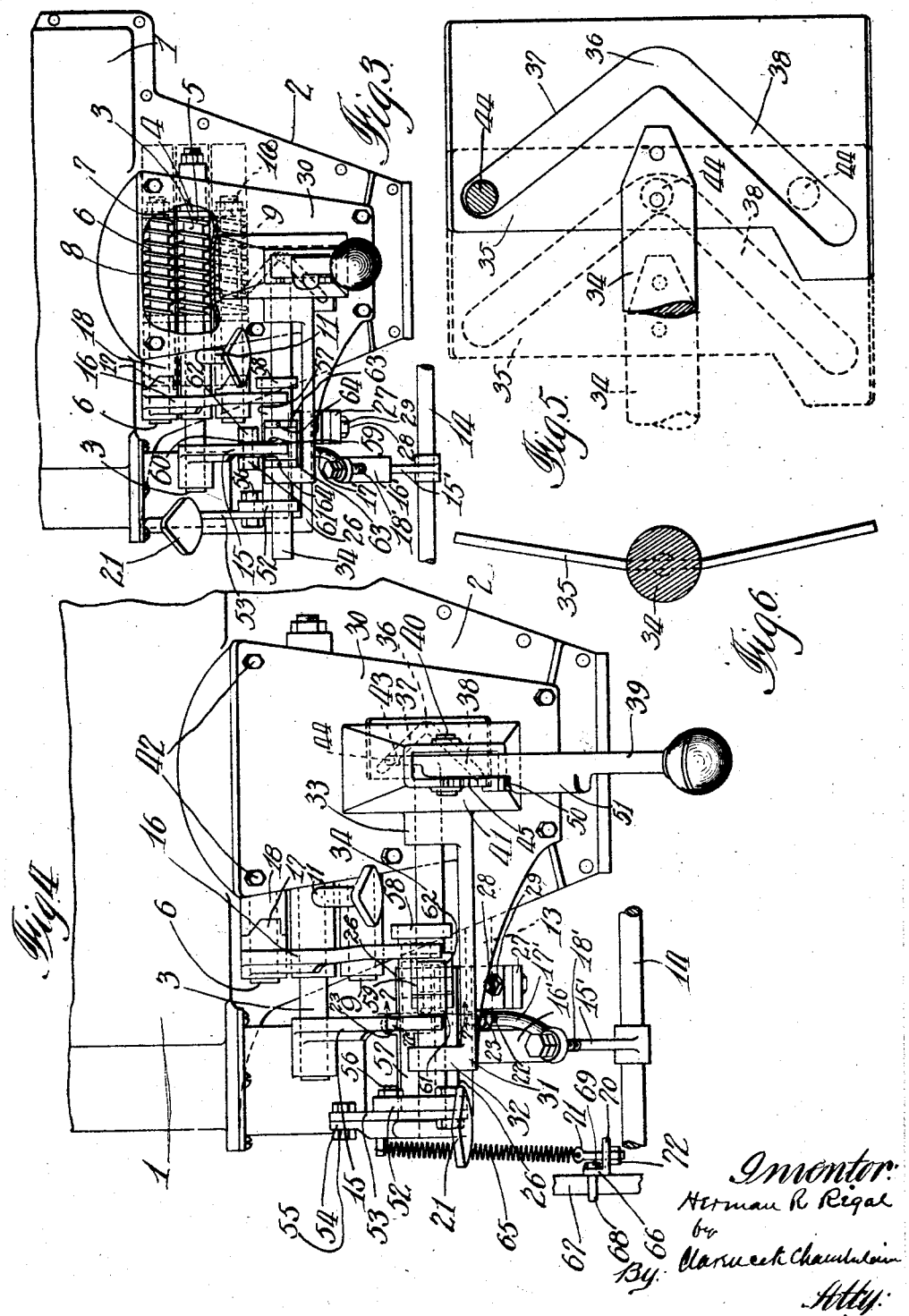

Patented Dec. 15, 1925.

1,565,396

UNITED STATES PATENT OFFICE.

HERMAN R. REGAL, OF CHICAGO, ILLINOIS.

SPEED CHANGING AND CONTROLLING MECHANISM FOR MOTOR VEHICLES OR THE LIKE.

Application filed December 9, 1924. Serial No. 754,730.

*To all whom it may concern:*

Be it known that I, HERMAN R. REGAL, a citizen of the United States, residing in Chicago, in the county of Cook and State of Illinois, have invented certain new and useful Improvements in Speed Changing and Controlling Mechanisms for Motor Vehicles or the like, of which the following is a specification.

This invention relates to that class of speed-changing and controlling mechanisms which are adapted to enable the speed of a motor vehicle, or a drive shaft and the parts driven thereby, to be changed, and whereby the direction of movement of a motor vehicle may be reversed.

The principal object of this invention is to provide a simple, economical and efficient speed-changing and controlling mechanism for motor vehicles, or the like.

A further object of the invention is to provide a speed-changing and controlling mechanism for motor vehicles having a transmission mechanism of the type commonly known as planetary transmission, with selective mechanism comprising a selecting lever, which may be in the form of a hand lever movable directly forward and backward upon a transverse horizontal axis, for selecting and determining which of a series of levers is to be actuated for changing speed or for reversing, and having means for actuating such levers selectively or in any desired order in accordance with the operation or position of the selecting means.

A further object of the invention is to provide means whereby a speed-changing and controlling mechanism of the type known as planetary transmission mechanism may be releasably locked or secured in position to operate at low speed when desired so as to enable the machine to be run at low speed while the low-speed lever or pedal is released or without the necessity of keeping the hand or foot of the operator upon the low-speed lever or upon the selecting lever during such operation at low speed.

Other and further objects of the invention will appear from the following description and claims, and from an inspection of the accompanying drawings which are made a part hereof.

The invention consists in the features, combinations, details of construction and arrangement of parts herein described and claimed.

In the accompanying drawing:—

Figure 1 is a view in side elevation of an improved speed-changing and controlling mechanism constructed in accordance with my invention, showing the selecting lever or hand lever in neutral position in full lines, and in the position which it will occupy when the device is set for low speed in broken lines, the foot lever or pedal for releasably holding and releasing the high-speed shaft on which it is fixed and the spring mechanism for actuating the high-speed, low-speed and reverse shafts respectively, being shown in initial or normal position in full lines, and in releasing or released position in broken lines;

Fig. 2 is a similar view in side elevation of the parts shown in Fig. 1, with the releasing lever shown in high-speed position in full lines and in reversing position in broken lines, and with the releasing lever or pedal shown in full lines in the position it would occupy when the device is set for high-speed, said lever being shown in broken lines in the position which it would occupy when the selecting lever and other parts of the device are set for reverse.

Fig. 3 is a plan view of my improved device shown in Figs. 1, 2 and 4, showing the same attached to a transmission casing of an ordinary and well known form and operatively connected with a transmission mechanism of the type commonly known as a planetary transmission mechanism, with the parts in the same position in which they are shown in full lines in Fig. 1, or in neutral position;

Fig. 4 is an enlarged plan view of the device shown in Figs. 1, 2 and 3, with the parts shown in full lines in high-speed position, and the longitudinally shiftable selecting shaft and its lever-actuating mechanism or rocking lever and wrist pin mechanism shown in broken lines in the position they would occupy when moved to the left from high-speed position to low speed position, and also shown again in broken lines as they would appear when moved from high-speed position or full line position to the right to reversing position;

Fig. 5 is an enlarged detail view of one end portion of the longitudinally movable shaft and its attached curved angularly slotted plate, by means of which said shaft is operatively connected with the lower arm of the selecting hand lever shown in Figs. 1, 2, 3, and 4;

Fig. 6 is an end view of the slotted plate shown in Fig. 5;

Fig. 7 is an enlarged detail view showing the rocking bell-crank lever and wrist-pin mechanism loosely mounted on and shiftable with a non-rotative longitudinally shiftable shaft, for operating the low-speed and reversing levers; and, Fig. 8 is an enlarged detail view taken on line 8—8 of Fig. 7 showing the means for releasably locking the parts in neutral position.

In constructing an improved speed-changing and controlling mechanism for motor vehicles or the like, in accordance with my invention, I provide a motor or engine 1 having a transmission casing or housing 2. The motor is supported upon the frame of a motor-vehicle and is adapted to be operatively connected with the driving shaft or driving mechanism of such vehicle,—all of which may be of any desired ordinary and well known or suitable form. And it is therefore deemed unnecessary to describe or show the same in detail.

The motor and transmission mechanism provided with my invention or constructed in accordance with my invention and improvements, are of course in practice portable, and when in use are ordinarily mounted upon a motor vehicle and operatively connected with the running gear of such vehicle which may be of any ordinary and well known or desired form, and which it is therefore deemed unnecessary and undesirable to describe or illustrate herein.

My improved speed-changing and controlling mechanism, in the form herein shown and described, is adapted to be attached to a transmission casing of an ordinary and well known form of automobile, and to be operatively connected with or form a part of a transmission mechanism of the form commonly known as a planetary transmission, such, for example, as the transmission of a Ford automobile or other similar automobile, truck, or motor vehicle.

Mounted in the transmission casing 2 is a transmission mechanism of the form commonly known as a planetary transmission, which comprises the usual low-speed shaft 3 rockingly mounted in suitable bearings in the casing and operatively connected with a low-speed band 4 which partially encircles and is adapted to operatively engage the periphery of a low-speed drum with which said shaft and band are operatively connected in the usual or ordinary manner. The usual compression spring 5 encircles the transverse low speed shaft 3 and is located between and in operative engagement with the opposite ends of the band 4, and tends to press the ends of said band apart so as to cause the band to release the low-speed drum when the spring is extended and permit the band to engage the periphery of the drum when the spring is compressed.

The usual reverse shaft 6 is mounted in parallel relation to the transverse low-speed shaft 3, and operatively connected with the opposite ends of a "reverse" band 7 in the usual manner, said band being adapted to partially encircle and frictionally engage the periphery of a "reverse" drum, and to release such drum in the usual manner when the shaft 6 is actuated or rocked in one direction to cause the band to engage the drum, and in an opposite direction to cause said band to release the drum. The usual compression spring 8 encircles the "reverse" shaft 6 and is located between and tends to press apart the opposite ends of the "reverse" band 7 so as to release the drum.

The usual transverse rockingly mounted brake shaft 9, brake band 10 and brake pedal or lever 11 are provided and adapted to operate in the usual and ordinary manner, and may be of any desired ordinary and well known or suitable form.

The usual transverse high-speed shaft or clutch-lever shaft 13 is rockingly mounted in suitable bearings in the transmission casing and operatively connected with the yoke and clutch spring for actuating or setting and releasing the clutch, or for causing the clutch to releasably connect the drive shaft directly with the crank shaft of the motor or engine, when the vehicle is to be operated at "high" speed, and for releasing the clutch and such direct connection between the drive shaft and crank shaft whenever such releasing of the clutch is desired, for example, when the machine is to be operated at low speed, or stopped, or when the brake is to be set, or when the clutch is to be released in case of emergency, or for any reason.

The usual controller shaft 14 with its cam lever $15^1$ and cam $16^1$ adapted to operatively engage a rocking lever arm $17^1$ fixed to the high-speed or clutch lever shaft 13, or an adjusting screw $18^1$ on such lever arm $17^1$, and having the usual hand lever—not shown —fixed to said controller shaft 14, is employed and adapted to operate in the ordinary and well known manner and for the usual purposes. The usual and ordinary purposes for which the controller shaft 14 is employed are of course well known to those skilled in the art, and its mode of operation is also well known. Its chief purpose is ordinarily to hold the clutch in neutral position, so as to enable the engine to be cranked without causing the car to start forward prematurely, and enable the driver to leave his seat without stopping the engine. It also ordinarily serves the purpose of an emergency brake. In a speed-changing and controlling mechanism constructed in accordance with my invention, however, the principal purpose, and in fact the only purpose for which the controller shaft 14 and its hand lever are required to be used, is that of releasing the clutch and setting the emergency brake in case of emergency or whenever desired. It is not required in a device constructed in accordance with my invention, for the purpose of holding the clutch in neutral position. The advantage of dispensing with the necessity of employing the emergency lever, or controller shaft 14 and its hand lever only in case of emergency will be readily understood and appreciated by those skilled in the art.

I provide a low-speed lever 15 which is fixed to and adapted to actuate and rock with the low-speed shaft 3, said lever 15 being employed instead of the ordinary "clutch-pedal." And a reversing lever 16 is fixed to and adapted to actuate or rock the reverse-lever shaft 6, the ordinary reverse pedal being dispensed with.

The reverse-lever shaft 6 has a movable cam member 17 fixed to and encircling said shaft. Said cam member 17 may be on or form a part of the hub of the lever 16; and the usual ordinary and well known form of stationary cam member 18 encircles the shaft 6 and has a helical or curved cam face which is engaged by an adjacent helical cam face of the cam member 17 on said shaft 6. These cam members thus tend to cause the spring 8 to be compressed and the reverse band 7 of the transmission mechanism to be tightened on its drum when the swinging end of the lever 16 is raised or moved upward and rearward. The tension of the spring 8 is released and the band 7 released or loosened from frictional engagement with the reverse drum encircled by said band when the lever 16 is lowered or released. The lever 16 is shown in lowered or released position in full lines in Fig. 2, and in raised position in broken lines in said figure. Said lever 16 is normally held in its lowered position by its own weight and by the action or tension of the compression spring 8 and the cam members 17 and 18 which encircle the shaft 6.

The low-speed shaft 3 is also provided with cam members one of which is fixed to and rocks with the said shaft 3, like the cam member 17 on shaft 6, and the other of which is stationary and encircles the shaft 3 and engages the cam member on said shaft 3, like the cam member 18 which encircles the shaft 6. These cam members which encircle and are operatively connected with the shaft 3 are inside the transmission casing 2, and are of the ordinary and well known form in common use in the art. And it is therefore deemed unnecessary to further describe or illustrate such cam members herein.

These cam members—not shown—and the compression spring 5 which encircle and are operatively connected with the low-speed shaft 3, tend to move said shaft endwise and to partially rotate or rock the shaft 3 and lever 15 in a direction opposite to the direction in which said shaft is moved or actuated by the raising of the forward end of said lever 15. In other words, said spring 5 and cam members encircling the shaft 3 tend to move or rock said shaft and the lever 15 to the released or lowered position shown in full lines in Fig. 1.

The raising or upward and rearward movement of the low-speed lever 15 mounted on the shaft 3 to the raised position of said lever, in which it is shown in broken lines in Fig. 1 will cause the spring 5 on the low-speed lever shaft 3 to be compressed and the low-speed band 4 to be tightened or held in frictional engagement with the periphery of the low-speed drum which is partially encircled by the band 4. The releasing or lowering of the low-speed lever 15 to its lowered or normal initial position in which it is shown in full lines in Fig. 1, will, of course, release the tension of the spring 5; and the low-speed band 4 will thus be released from frictional engagement with the low-speed drum. The lever 15 is held in its initial normal or lowered position by its own weight and by the spring 5 and the cam members—not shown—which encircle the shaft 3.

A main clutch-releasing pedal or lever 21 is operatively connected with and, by preference, mounted on and in fixed relation to the high-speed or clutch-lever shaft 13. Suitable adjustable connecting means may be provided for adjustably connecting said lever or pedal 21 with the shaft 13, such, for example, as one or more adjusting screws 22 in threaded engagement with a projecting arm or arms 23 on the lever or pedal 21. Each adjusting screw 22 has its bottom end in abutting engagement with an adjacent arm 24 or 17¹ fixed to the shaft 13. A lock nut 25 may be provided for holding each screw 22, and thereby the lever 21, in any desired adjusted position.

The clutch-releasing lever or pedal 21 may be fixed to the high-speed or clutch lever shaft 13, or secured to said shaft by any desired ordinary and well known or suitable securing means. It is, by preference, mounted on and secured in fixed relation to the said shaft so as to rock with the shaft and serve as a means for rocking and for releasing the shaft, or for actuating the shaft 13 in one direction against the tension of the resilient shaft-actuating means or spring mechanism operatively connected with the shaft and with the clutch mechanism, and for releasing and permitting the actuating or rocking of the shaft in an opposite direction by the action of such resilient shaft-actuating and clutch-actuating means or spring mechanism. In other words, the clutch-releasing and actuating lever or pedal 21 fixed to the clutch-lever shaft or high speed shaft 13 is adapted to be pressed forward or held in its forward clutch-releasing position by the foot of the operator. And upon being released from any forward clutch-releasing position by the removal of the foot of the operator from the pedal, or otherwise, or upon being released from the position which said lever or pedal 21 will occupy when the speed-changing or controlling mechanism is set for low speed, or in neutral position, said clutch-releasing and actuating lever or pedal 21 and the high-speed or clutch-lever shaft 13 will be actuated automatically in an opposite direction by the action of the main clutch-actuating spring of the transmission mechanism, which spring is of the usual ordinary and well known form in common and general use in transmission mechanisms of the planetary type and which it is therefore deemed unnecessary and undesirable to describe or show herein. The main clutch-actuating spring is operatively connected with the clutch in the usual manner, and the shaft 13 is connected with said spring by the usual ordinary and well known connecting means, such as a yoke and lever connected with the shaft 13 and in engagement with the clutch-actuating spring by means of which the clutch is thrown into engaging or clutching position whenever such spring is released and permitted to extend itself or to act.

In the form of the device shown in the accompanying drawings the clutch-releasing and actuating lever 21 is provided with an extension or arm portion 26 which is secured to the end of the shaft 13 by means of suitable securing means, such, for example, as a clamping member 27 secured in position upon said arm portion or extension 26 by means of clamping screws or headed bolts 28 and threaded nuts 29 upon and in threaded engagement with the threaded end portions of said bolts, or by similar or equivalent securing means, such, for example, as a recessed hub or projecting portion or extension on the lever or pedal 21 into which the end of the shaft 13 is inserted and secured by any ordinary or desired securing means such as a tapered pin, one or more set screws or other well known securing means. The purpose of the extension 26 on the lever or pedal 21 and fixed to and forming an extension of the shaft 13 is to enable the lever or pedal 21 to occupy the desired operative position with respect to the speed-changing and controlling mechanism and to be attached with facility and in an efficient manner to the ordinary high-speed or clutch-lever shaft 13 in common use in automobiles and in connection with or forming part of the ordinary and well known form of transmission mechanism of the planetary type in common use, so as to avoid the expense and trouble of removing any such high-speed or clutch-lever shaft as may be already in use or in position for use upon such machine and replacing it with a new or longer shaft which would make the use of such an extension 26 unnecessary.

The clutch-releasing and actuating lever or pedal 21 is operatively connected with the levers 15 and 16,—and thereby with the low-speed lever shaft 3 and band 4, and the reverse lever shaft 6 and the band 7,—and with selective actuating and releasing means of which said lever or pedal 21 may be said to form a part, as follows:

A supporting plate or bracket member 30, which is, by preference adapted to be rigidly secured in position upon and form a cover for a transmission casing, such as the casing 2, and to serve in lieu of the original cover for such casing, is provided.

This bracket member or plate 30 has an integral bracket arm or extension 31 which forms or is provided with bearings 32, 33 which are bored out or provided with horizontal openings through which extends a longitudinally movable non-rotative shaft or rod 34. This reciprocating or longitudinally movable non-rotative shaft or rod 34 has at one end thereof an approximately flat but preferably somewhat curved angularly grooved or slotted plate 35 which is fixed to the rod or shaft 34. The plate 35 has an angular groove or slot 36 therein which is approximately V-shaped and extends transversely across and on opposite sides of the axis or longitudinal axial center of the shaft or rod 34. The arms 37 and 38 of the angular slot 36 thus located on opposite sides of the axis of the non-rotative shaft or rod 34 are disposed in oblique relation to said axis and to the direction of movement of the longitudinally movable shaft, and at approximately right angles to each other. (See Figs. 4 and 5.) A selecting lever 39, which is by preference in the form of a hand lever the normal or neutral initial position of which is upright, as shown in Figs. 1 and 3, is rockingly or pivotally mounted upon a suitable support, such, for example, as a transverse horizontal pivot pin or axle 40 which extends through a suitable transverse opening in the lever 39 and is supported at its opposite ends in upright side members or wall portions of a housing 41 on or formed in one integral piece with the plate 30 which is adapted to be rigidly secured to the casing 2 by means of headed securing screws 42 or other suitable securing means. The lower lever arm 43 of the selecting or adjusting lever 39 has a bottom slot-engaging end portion 44 which extends into and is adapted to be moved longitudinally of the angular slot 36 from end to end of said slot, or to different predetermined intermediate positions, or any desired one of a series of predetermined positions in said slot in any desired order, thereby causing the shaft or rod 34 to be moved or adjusted longitudinally and releasably held in corresponding positions which are determined by the positions and movements of the selecting lever 39.

The upright lever-supporting bracket member or housing 41 has a notched upper curved marginal portion or segment 45 having a series of notches 46, 47, 48, and 49; and the lever 39 has mounted thereon a spring-pressed bolt 50 which is mounted in a suitable support or socket member 51 on said lever, and the tapered bottom end of which bolt or catch is adapted to be pressed into said notches 46, 47, 48 and 49, successively or alternately in any desired order. In each position of the lever 39 the spring-pressed bolt 50 thus automatically and releasably engages a notch which corresponds with the position of the lever. And the position of the movable shaft or rod 34 corresponds with and is determined by the operation and position of the selecting lever 39.

Loosely or rockingly mounted upon the longitudinally movable non-rotative shaft or rod 34 is a crank or lever arm 52, the free end of which is connected with the releasing and actuating lever or pedal 21 by means of a connecting rod or pitman 53, one end of said connecting rod 53 being connected with a projecting arm portion 54 of the lever or pedal 21 by means of a pivot pin or bolt 55, and the other end of said connecting rod being connected with the crank arm or lever 52 by means of a pivot pin or bolt 56, or other well known or suitable connecting means. This lever or crank arm 52 is thus adapted to permit the movement of the shaft or rod 24 longitudinally without affecting the position of said crank or lever arm. And this crank or lever arm 52 is provided with a crank or wrist pin 57 which is considerably elongated, one end of the wrist pin or crank pin 57 being fixed to the crank or lever arm 52 and the other end being, by preference, fixed to and supported by a lever or crank arm member 58 which, like the crank arm 52, is loosely supported upon the non-rotative longitudinally movable shaft or rod 34 and in fixed rigid relation to the said crank arm 52. The elongated wrist pin or crank pin 57 and its supporting rocking arms 52 and 58 thus form a bail-like rocking crank and wrist-pin mechanism which is operatively connected with and adapted to be actuated or rocked by the lever or pedal 21 already described.

Operatively connected with and adapted to be rocked or actuated by the elongated wrist pin or rod 57 and its supporting crank or lever arms 52, 58, is a rocking crank arm or lever 59 which is loosely mounted on and movable longitudinally of the wrist pin or rod 57 and between the rocking crank or lever arms 52, 58. This rocking crank or lever 59 is provided with an opening through which the elongated wrist pin or rod 57 extends, and with another opening through which the non-rotative shaft or rod 34 extends. (See Fig. 7.)

The crank or lever arm 59 is thus free to slide or move longitudinally of the elongated wrist pin or rod 57, and is adapted to be actuated or rocked with and by means of the elongated wrist pin or rod 57 and its supporting crank or lever arms 52, 58 and by the releasing and actuating lever or pedal 21 which actuates or rocks the entire rocking crank arm and wrist pin mechanism, comprising the elongated wrist pin or rod 57 and its supporting crank or lever arms 52, 58. and the crank or lever arm 59, in any position into which said lever arm 59 is adapted to be moved or adjusted by means of the longitudinally movable non-rotative shaft or rod 34.

The crank arm or lever 59 is provided with a lever-actuating pin 60 the ends of which project outward on opposite sides of the lever 59 in position to be moved into and out of operative engagement with the levers 15 and 16 already described. Anti-friction rollers 61, 62 are rotatively mounted on the opposite projecting ends of the lever-actuating crank pin or wrist pin 60. The crank arm or lever 59 and its crank pin 60 and anti-friction rollers 61, 62 are thus adapted to rock with and to be actuated by the operation of the elongated wrist pin or rod 57 and its supporting crank or lever arms 52, 58, all of said parts being adapted to rock upon a common axis which is the axis or longitudinal center of the non-rotative shaft or rod 34. The crank or lever arm 59, however, is mounted upon and so connected with the non-rotative longitudinally movable shaft or rod 34 that any movement of said shaft or rod 34 longitudinally will cause a corresponding movement of said crank or lever arm 59 and its pin 60 and rollers 61, 62 longitudinally of and with said shaft or rod 34. In other words the crank or lever arm 59 is adapted to rock or partially rotate upon and with respect to the non-rotative shaft or rod 34, but is so connected with said shaft or rod by means of collars 63, 63 which encircle the shaft 34 on opposite sides of the crank or lever arm 59 and are fixed to said shaft by means of set screws or pins 64, that any movement of said shaft 34 endwise in either direction will move the crank arm or lever 59 transversely with respect to the low-speed lever 15 and the reverse lever 16.

A tension spring 65 is operatively connected directly or indirectly with the releasing and actuating lever or pedal 21, and is adapted to move or tend to move said lever forward or in a direction opposite to the direction in which the lever or pedal is moved by the foot of the operator. The spring 65 is, by preference, connected at one end with said lever or pedal 21; and the opposite or forward end of the spring, which is a tension spring, is connected with a suitable stationary support, and is provided with means for increasing or decreasing or adjusting and regulating the tension of the spring. For this purpose a casting or plate which may be a piece of angle iron 66 is secured to a frame member of the vehicle, such, for example, as a side frame member or channel iron 67 which forms one of the side frame members of the vehicle body, by means of a U-bolt 68 and nuts 69 in threaded engagement with the ends of the U-bolt which may extend through perforations in the plate 66 or may be outside of the margins of the channel iron frame member 67 and plate 66. One flange 70 of the plate 66 is perforated; and an eye-bolt 71 extends through and is supported by this perforated flange 70. The forward end of the spring 65 is attached to and secured in the opening in the loop or eye of the eye-bolt 71. And a threaded nut 72 in threaded engagement with the threaded end of the eye-bolt serves to hold the eye-bolt in operative position. The eye-bolt and nut and their support thus serve as a means for adjusting the tension of the spring and for holding the forward end of the spring in position. And no boring of holes is required in mounting the spring.

From the foregoing, it will be readily understood by those skilled in the art that the spring 65 above described, which is connected with the pedal or lever 21, and the main clutch spring or high-speed clutch spring of the transmission mechanism which is of an ordinary and well known form in common use and familiar to those skilled in the art, co-act with each other in causing the lever 21 to move forward when released from the pressure of the foot of the operator, and in actuating or raising the low-speed lever 15 and reversing lever 16, as well as in the operation of setting or causing the movement of the high-speed clutch to engaged or clutching position. It will also be readily understood that the high-speed clutch may be released or disengaged either by the forward movement or forward pressure upon the pedal or lever 21 or by the operation of the emergency lever— not shown—which is fixed to the controller shaft 14.

The lever 52 may be in the form of a bell-crank lever having an upper arm portion which is connected with the connecting rod 53, and a lower lever arm 52' in which one end of the elongated crank pin or wrist-pin 57 is supported, said crank arm or lever arm portion 52' being opposite the crank arm 58 in which the other end of the crank pin or wrist pin 57 is supported. But it is quite possible and obviously practicable to make the lever arm 52 of suitable width and dimensions so that the wrist-pin will be supported in its proper operative position thereby.

The shiftable lever or crank member 59 above described, is, by preference, in the form of a bell crank lever having a bottom lever arm 73 which is provided with a projecting pin, boss or detent 74 which projects endwise in parallel relation to the axis of the longitudinally movable non-rotative shaft 34 and beyond the side face of said lever or crank 59 in position to enter and releasably engage an opening or socket 75 in a stationary adjacent frame member, such for example, as the perforated end portion of the supporting bracket arm 31 already described, in which said non-rotative longitudinally shiftable shaft 34 is supported. The pin or detent 74 on the crank member 59 is adapted to enter the opening 75 only when the shaft 34 and crank or lever 59 are in neutral position, or in other words, when said shiftable shaft 34 and lever 59 are at the end or extremity of their path of movement toward the left of Fig. 3, or in the position in which said parts are shown in full lines in said Fig. 3, which is neutral position. The detent or locking pin 74 is thus adapted to prevent the rearward movement of the pedal or lever 21 and to prevent the raising or operation of either the low-speed lever 15 or the reversing lever 16, or the engagement of the high-speed clutch or any clutch in the transmission mechanism when said detent or pin 74 is in engagement with the recess or opening 75, or when the selecting lever or speed-changing and controlling mechanism is in neutral position. (See Figs. 3, 7 and 8.)

In operation: Assuming that the speed-changing and controlling mechanism constructed and adapted to operate in accordance with my invention is first in neutral or initial position, as shown in full lines in Figs. 1 and 3, the operator first presses the pedal or lever 21 forward, or subjects said lever to a forward pressure by placing his foot against it. Such a pressure may be applied to the lever or pedal 21 in any position in which it may be located, and whenever the high-speed clutch is to be released or prevented from becoming engaged. The selecting lever 39 is then moved or shifted to any desired predetermined position, for example, to low speed position while the foot of the operator is held in engagement with the pedal or lever 21, and said pedal or lever 21 is then released by removing or relieving the pressure, thus permitting the pedal or lever 21 to be moved rearward by the action of the spring 65 and the clutch spring of the transmission mechanism, while the shiftable shaft 34 and crank arm or lever 59 and its crank pin and one of the lever-engaging rollers 61 are in position to operatively engage and actuate or raise the low-speed lever 15.

In order to set the device or mechanism in position for high-speed, the lever or pedal 21 is subjected to a forward pressure by the foot of the operator, in whatsoever position said lever happens to be, and the selecting hand lever 39 is moved to high-speed position, in which position it is shown in full lines in Figs. 2 and 4. The setting of the selecting hand lever is done while the foot of the operator is exerting sufficient pressure against the lever 21 to prevent it from being moved rearward or toward its clutch-engaging position by the action of the spring 65 and the clutch spring of the transmission mechanism. As soon as the selecting hand lever is in the proper position to enable the rollers 61 and 62 on the crank pin of the shiftable lever 59 and said lever 59 itself, to occupy a position between and out of engagement with both the low-speed lever 15 and the reversing lever 16, and permit said lever 59 and its crank pin and rollers to move from their lowered to their raised position in which last-mentioned position they are shown in full lines in Fig. 4, without engaging or operating either of said levers 15 or 16, the pedal or lever 21 is relieved from the pressure of the foot of the operator and permitted to be actuated by the action of the spring 65 and the high-speed clutch spring of the transmission mechanism, thus causing the high-speed clutch to be set or engaged.

In order to set the device or mechanism in reversing position, the lever or pedal 21 is held against the action or tension of the spring 65 and of the high-speed clutch spring of the transmission mechanism by the pressure of the foot of the operator against said pedal or lever 21, and the selecting lever is moved to the extreme forward limit of its path of movement, or to reversing position, with the spring-pressed bolt 50 on said selecting lever in position to engage the corresponding notch 49 in the notched segment adjacent to said selecting hand lever. And the pressure against the pedal or lever 21 is then removed or relieved, while the shiftable lever 59 and one of the rollers on its crank pin 62 are in position to cause such roller to engage the end of the reversing lever 16 and raise said lever from the position in which it is shown in full lines in Fig. 2 to the raised position in which it is shown in broken lines in said figure.

When the operator has pressed lever 21 forward or downward to release the clutch, and shifts the lever 59 to engage arm 15, which is the low speed lever arm, to obtain low speed, the clutch is prevented from re-engaging and the high speed gears are prevented from being thrown into operation when the lever 21 is released. This is accomplished by preventing the upward movement of the lever 59, shown in Fig. 7, to high speed position shown in broken lines in said figure, thus preventing the operation of the high speed clutch lever shaft to a position which will permit the clutch to re-engage.

The raising of the low speed lever 15 is accomplished by the movement of the shifting lever 59 and its crank pin 60 and rollers 61 from the position shown in full lines in Fig. 7 to a slightly raised position intermediate the full line position and the broken line position of said parts in said figure. In order that the clutch should be re-engaged or the high speed gears thrown into operation, it would be necessary for the lever 59 and its crank pin 60 to move still further upward to high speed or broken line position shown in said Fig. 7.

The low speed lever 15 is prevented from moving upward beyond the position to which it is raised by the shifting rocking lever 59, by the tightening of the low speed band upon its corresponding low speed drum, said band being connected with the lever 15 through the medium of the low speed lever shaft.

The lever 15, being directly over the lever 59, prevents such further upward movement of the latter to its raised or high speed position shown in broken lines in said Fig. 7, as would be necessary in order to permit the clutch to re-engage or the high speed gears to be thrown into operation.

The same is true in regard to the reversing lever 16 which also reaches its raised position before the shifting lever 59 and its crank pin or pins 60 reach the high speed position shown in broken lines in said Fig. 7, which position must necessarily be reached before the clutch can re-engage and before the high speed gears can be thrown into operation.

In other words, when either the reversing lever 16 or the low speed lever 15 is in its raised position, the band connected with such lever is tightened upon its corresponding drum, and the crank pin 60 on the shifting lever 59 is in a position directly beneath the lever 15 or 16 thus operated and intermediate the full line position and the broken line position shown in Fig. 7, or below high speed or clutch engaging position, and is prevented from moving further upward or to such broken-line position or high speed position by the tight engagement of the low speed band or the reversing band, as the case may be, upon its corresponding drum.

Obviously, the lever 21 cannot return to its initial or broken line position shown in Fig. 1, or to a position which will permit the high speed clutch lever shaft to allow the clutch to re-engage and the high speed gears to be thrown into operation while either the raised low speed lever 15 or the raised reversing lever 16 is over the shifting lever 59 and the corresponding band is tight upon its drum, or until the shifting lever 59 is shifted from a position beneath the levers 15 and 16 to high speed position between said levers, thus permitting the shifting lever 59 to pass upward between said levers 15 and 16 to high speed position as shown in broken lines in Fig. 7.

I claim:

1. In a mechanism of the class described, the combination of a releasing and actuating lever or pedal mounted on and fixed to a high-speed clutch-lever shaft of a transmission mechanism, a low-speed lever, a reversing lever, and a shiftable lever operatively connected with and adapted to be actuated by said first-mentioned lever and movable into and out of engagement with said low-speed lever and said reversing lever alternately.

2. In a mechanism of the class described, the combination of a releasing and actuating lever mounted on and fixed to a high-speed clutch-lever shaft of a transmission mechanism, a low-speed lever and a reversing lever each adapted to be operatively connected with said transmission mechanism, an intermediate lever operatively connected with said first-mentioned lever and normally out of engagement with said low-speed lever and said reversing lever, and means for operatively connecting said intermediate lever with low-speed lever and said reversing lever successively in any desired order.

3. In a mechanism of the class described, the combination of a releasing and actuating lever mounted on and fixed to a high-speed clutch-lever shaft of a transmission mechanism, a low-speed lever and a reversing lever each adapted to be operatively connected with said transmission mechanism, a shiftable lever operatively connected with said first-mentioned lever, and means for operatively connecting said shiftable lever with said low-speed lever and said reversing lever respectively.

4. In a mechanism of the class described, the combination of a releasing and actuating lever mounted on and fixed to a high speed clutch lever shaft of a transmission mechanism of a motor vehicle, a low-speed lever and a reversing lever each adapted to be operatively connected with said transmission mechanism, an intermediate lever rockingly mounted and connected with and adapted to be actuated by said first-mentioned lever, and means for operatively connecting said intermediate rockingly mounted lever with said low-speed lever and said reversing lever respectively.

5. In a mechanism of the class described, the combination of a releasing and actuating lever mounted on and fixed to a high speed clutch lever shaft of a transmission mechanism of a motor vehicle, a low-speed lever and a reversing lever each adapted to be operatively connected with the transmission mechanism of such vehicle, an intermediate lever connected with and adapted to be actuated by said first-mentioned lever, and means on said intermediate lever adapted to operatively engage said low-speed lever and said reversing lever alternately.

6. In a mechanism of the class described, the combination of a releasing and actuating lever mounted on and fixed to a high speed clutch lever shaft of a transmission of a motor vehicle, a low-speed lever and a reversing lever each adapted to be operatively connected with the transmission mechanism of such motor vehicle, an intermediate lever connected with said first-mentioned lever and normally disconnected from said low-speed lever and said reversing lever, and means on said intermediate lever adapted to operatively connect the same with said low-sped lever and said reversing lever successively.

7. In a mechanism of the class described, the combination of a releasing and actuating lever adapted to be operatively connected with the clutch mechanism of a motor vehicle, a low-speed lever and a reversing lever each adapted to be operatively connected with the transmission mechanism of such vehicle, an intermediate lever connected with said first-mentioned lever and provided with a wrist-pin on said intermediate lever, and means shiftable on said wrist-pin and adapted to operatively engage said low-speed lever and said reversing lever successively.

8. In a mechanism of the class described, the combination of a releasing and actuating lever adapted to be operatively connected with the clutch mechanism of a motor vehicle, a low-speed lever and a reversing lever each adapted to be operatively connected with the transmission mechanism of such vehicle, an intermediate lever connected with said first-mentioned lever and provided with a wrist-pin on said intermediate lever, and a shiftable lever engaging member slidably mounted on said wrist-pin and adapted to operatively engage said low-speed lever and said reversing lever alternately in any desired order.

9. In a mechanism of the class described, the combination of a releasing and actuating lever adapted to be operatively connected with the clutch mechanism of a motor vehicle, a low-speed lever and a reversing lever each adapted to be operatively connected with the transmission mechanism of such vehicle, intermediate connecting means comprising a crank-pin operatively connected with and adapted to be actuated by said first-mentioned lever, a shiftable lever member on and movable longitudinally of said crank-pin, and crank-pin mechanism on said shiftable lever member and adapted to operatively engage said low-speed lever and reversing lever successively.

10. In a mechanism of the class described, the combination of a releasing and actuating lever adapted to be operatively connected with the clutch mechanism of a motor vehicle, a low-speed lever and a reversing lever each adapted to be operatively connected with the transmission mechanism of such vehicle, an intermediate lever connected with said first-mentioned lever and provided with an elongated crank-pin on said intermediate lever, a shiftable lever member slidably mounted on said crank-pin, and crank-pin mechanism on and extending on opposite sides of said shiftable lever member and adapted to be moved into and out of engagement with said low-speed member and said reversing lever respectively.

11. In a mechanism of the class described, the combination of a releasing and actuating lever mounted on and fixed to a high speed clutch lever shaft of a transmission mechanism of a motor vehicle, a low-speed lever, a reversing lever, a shiftable lever operatively connected with and adapted to be actuated by said first-mentioned lever, and means for shifting said shiftable lever into and out of engagement with said low-speed lever and said reversing lever respectively.

12. In a mechanism of the class described, the combination of a releasing lever mounted on and fixed to a high speed clutch lever shaft of a transmission mechanism of a motor vehicle, a low-speed lever and a reversing lever each adapted to be connected with the transmission mechanism of such vehicle, shiftable lever-actuating and releasing means operatively connected with said first mentioned lever, and means for moving said shiftable lever-actuating and releasing means into and out of engagement with said low-speed lever and said reversing lever respectively.

13. In a mechanism of the class described, the combination of a releasing lever mounted on and fixed to a high speed clutch lever shaft of a transmission mechanism of a motor vehicle, a low-speed lever and a reversing lever each adapted to be connected with the transmission mechanism of such vehicle, intermediate lever-actuating and releasing means connected with and adapted to be actuated by said first-mentioned lever and normally out of engagement with said low-speed lever and said reversing lever, and means for operatively connecting said intermediate lever-actuating and releasing means with said low-speed lever and said reversing lever respectively.

14. In a mechanism of the class described, the combination of a releasing lever mounted on and fixed to a high speed clutch lever shaft of a transmission mechanism of a motor vehicle, a low-speed lever and a reversing lever each adapted to be connected with the transmission mechanism of such vehicle, intermediate lever mechanism comprising shiftable lever-actuating and releasing means connected with and adapted to be actuated by said first-mentioned lever, and means for shifting said shiftable lever-actuating and releasing means into and out of engagement with said low-speed lever and said reversing lever in any desired pre-determined order.

15. In a mechanism of the class described, the combination of a releasing and actuating lever mounted on and fixed to a high speed clutch lever shaft of a transmission mechanism of a motor vehicle, a low-speed lever and a reversing lever each adapted to be connected with the transmission mechanism of such vehicle, shiftable lever-actuating and releasing means connected with and adapted to be actuated by said first-mentioned lever, means for shifting said shiftable lever-actuating and releasing means into and out of operative engagement with said low-speed lever and said reversing lever respectively, and means for actuating said first-mentioned lever.

16. In a mechanism of the class described, the combination of a releasing and actuating pedal lever mounted on and fixed to a high-speed clutch-lever shaft of a transmission mechanism, a low-speed lever, a reversing lever, shiftable lever-actuating and releasing means connected with and adapted to be actuated by said first-mentioned lever, means for shifting said shiftable lever-actuating and releasing means into and out of operative engagement with said low-speed lever and said reversing lever respectively, and resilient lever-actuating means operatively connected with said first-mentioned lever, for operating the same.

17. In a mechanism of the class described, the combination of a releasing and actuating lever mounted on and fixed to a high speed clutch lever shaft of a transmission mechanism of a motor vehicle, a low-speed lever and a reversing lever each adapted to be connected with the transmission mechanism of such vehicle, intermediate shiftable lever-actuating and releasing means connected with and adapted to be actuated by said first-mentioned lever, means for shifting said shiftable lever-actuating and releasing means into and out of operative engagement with said low-speed lever and said reversing lever selectively, and means for actuating said first-mentioned lever.

18. In a mechanism of the class described, the combination of a releasing and actuating lever adapted to be mounted on a high-speed clutch-lever shaft of a transmission mechanism of a motor vehicle, a low-speed lever and a reversing lever adapted to be connected with said transmission mechanism, intermediate lever-actuating and releasing means connected with and adapted to be actuated by said first-mentioned lever, means for operatively connecting said intermediate lever-actuating and releasing means with said low-speed lever and said reversing lever selectively in any desired order, and means for actuating said first-mentioned lever.

19. In a mechanism of the class described, the combination of a releasing and actuating lever adapted to be connected with the clutch mechanism of a motor vehicle, a low-speed lever and a reversing lever each adapted to be connected with the transmission of such vehicle, intermediate shiftable lever-actuating and releasing means connected with and adapted to be actuated by said first-mentioned lever, and a longitudinally movable shaft connected with and adapted to move said intermediate shiftable lever-actuating and releasing means into and out of engagement with said low-speed lever and said reversing lever respectively.

20. In a mechanism of the class described, the combination of a releasing and actuating-lever adapted to be connected with the clutch mechanism of a motor vehicle, a low-speed lever and a reversing lever each adapted to be connected with the transmission of such vehicle, intermediate shiftable lever-actuating and releasing means connected with and adapted to be actuated by said first-mentioned lever, a shaft connected with and adapted to move said intermediate shiftable lever-actuating and releasing means into and out of engagement with said low-speed lever and said reversing lever respectively, and means for operating said shaft.

21. In a mechanism of the class described, the combination of a releasing and actuating-lever adapted to be connected with a high-speed clutch-lever shaft of a transmission mechanism, a low-speed lever, a reversing lever, intermediate shiftable lever-actuating and releasing means connected with and adapted to be actuated by said first-mentioned lever, a shaft connected with and adapted to move said intermediate shiftable lever-actuating and releasing means into and out of engagement with said low-speed lever and said reversing lever respectively, means for operating said shaft, and means for operating said first-mentioned lever.

22. In a mechanism of the class described, the combination of a releasing and actuating lever adapted to be connected with a high-speed clutch-lever shaft of a transmission mechanism, a low-speed lever, a reversing lever, intermediate shiftable lever-actuating and releasing means connected with and adapted to be actuated by said first-mentioned lever, a shaft connected with and adapted to move said intermediate shiftable lever-actuating and releasing means into and out of engagement with said low-speed lever and said reversing lever respectively, and a selecting lever operatively connected with said shaft.

23. In a mechanism of the class described, the combination of a releasing and actuating pedal adapted to be connected with a high-speed clutch-lever shaft of a transmission mechanism, a low-speed lever, a reversing lever, intermediate shiftable lever-actuating and releasing means connected with and adapted to be actuated by said first-mentioned lever, a longitudinally movable shaft connected with and adapted to move said intermediate shiftable lever-actuating and releasing means into and out of operative engagement with said low-speed lever and said reversing lever respectively, a selecting lever operatively connected with and adapted to actuate said shaft, and means for operating said first-mentioned pedal.

24. In a mechanism of the class described, the combination of a releasing and actuating lever adapted to be connected with a high-speed clutch-lever shaft of a transmission mechanism, a low-speed lever and a reversing lever adapted to be connected with said transmission mechanism, intermediate shiftable lever-actuating and releasing means connected with and adapted to be actuated by said first-mentioned lever, a longitudinally movable shaft connected with said intermediate shiftable lever-actuating and releasing means and adapted to move the same into and out of engagement with said low-speed lever and said reversing lever respectively, a slotted plate fixed to said longitudinally movable shaft, and a selecting lever mounted on a suitable support and having a lever arm portion in engagement with the slotted portion of said plate, for operating said plate and shaft.

In witness whereof I have hereunto set my hand at Chicago, Illinois, this 24th day of November, 1924.

HERMAN R. REGAL.